United States Patent
Toebes et al.

(10) Patent No.: US 11,292,667 B2
(45) Date of Patent: Apr. 5, 2022

(54) METHOD AND SYSTEM FOR AUTOMATED TRANSPORT OF ITEMS

(71) Applicant: NextShift Robotics, Inc., Lowell, MA (US)

(72) Inventors: Stephen Toebes, Sunderland, MA (US); Mary Ellen Sparrow, Lowell, MA (US)

(73) Assignee: Jasci Robotics, LLC., Lowell, MA (US)

( * ) Notice: Subject to any disclaimer, the term of this patent is extended or adjusted under 35 U.S.C. 154(b) by 148 days.

(21) Appl. No.: 16/539,715

(22) Filed: Aug. 13, 2019

(65) Prior Publication Data

US 2020/0055671 A1    Feb. 20, 2020

Related U.S. Application Data

(60) Provisional application No. 62/718,734, filed on Aug. 14, 2018.

(51) Int. Cl.
*B65G 1/137*    (2006.01)

(52) U.S. Cl.
CPC .... *B65G 1/1375* (2013.01); *B65G 2201/0235* (2013.01)

(58) Field of Classification Search
CPC combination set(s) only.
See application file for complete search history.

(56) References Cited

U.S. PATENT DOCUMENTS

| | | | |
|---|---|---|---|
| 5,129,777 A | 7/1992 | Pohjonen et al. | |
| 9,120,622 B1* | 9/2015 | Elazary | B25J 19/023 |
| 2017/0107058 A1 | 4/2017 | Nakamoto et al. | |
| 2017/0166399 A1* | 6/2017 | Stubbs | B65G 1/1373 |
| 2017/0334644 A1 | 11/2017 | Otto et al. | |

FOREIGN PATENT DOCUMENTS

| | | |
|---|---|---|
| DE | 10102999 | 8/2002 |
| EP | 2441709 | 4/2012 |
| EP | 3020515 | 5/2016 |

OTHER PUBLICATIONS

International_Search_RPT_PCTUS2016046492_dated Aug. 14, 2019.

* cited by examiner

*Primary Examiner* — Kyle O Logan
(74) *Attorney, Agent, or Firm* — Perman & Green, LLP

(57) ABSTRACT

An automated guided vehicle includes a frame forming a payload area, a vacuum case transfer mechanism having one or more degrees of freedom and configured to vacuum-couple with a case, and a friction case transfer mechanism that is configured to grip the case and at least cooperate with the vacuum case transfer mechanism to effect transfer of the case to the payload area.

20 Claims, 9 Drawing Sheets

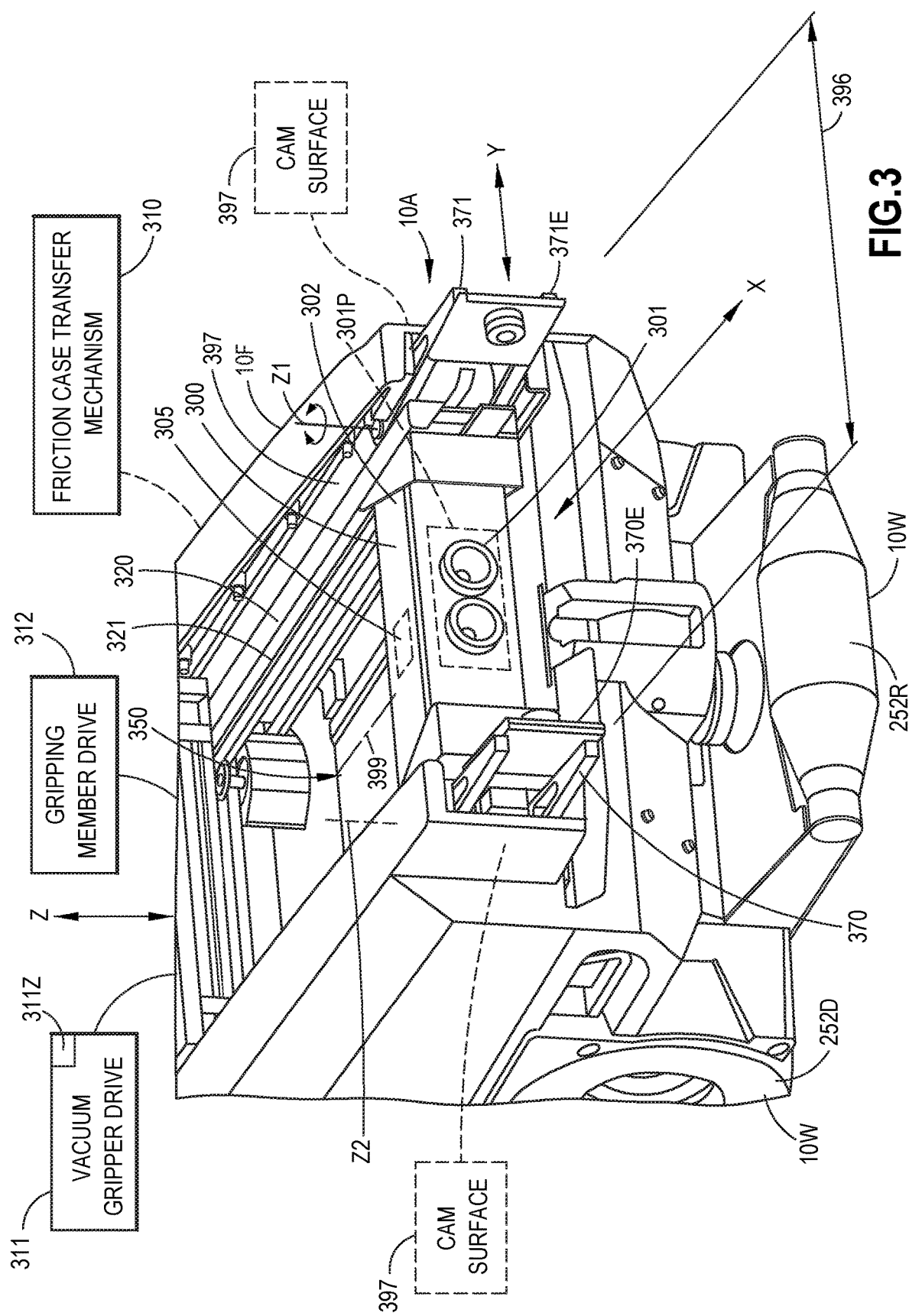

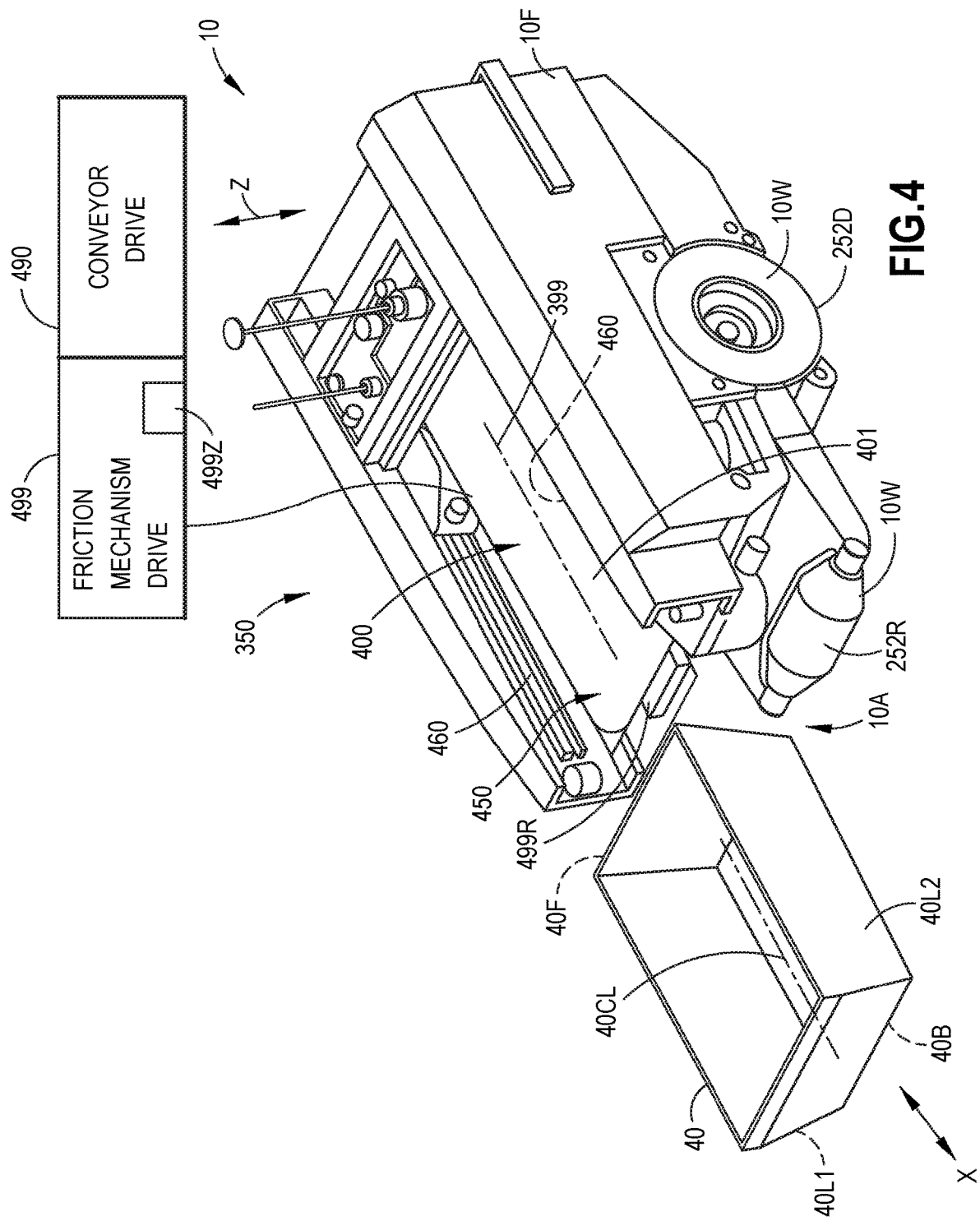

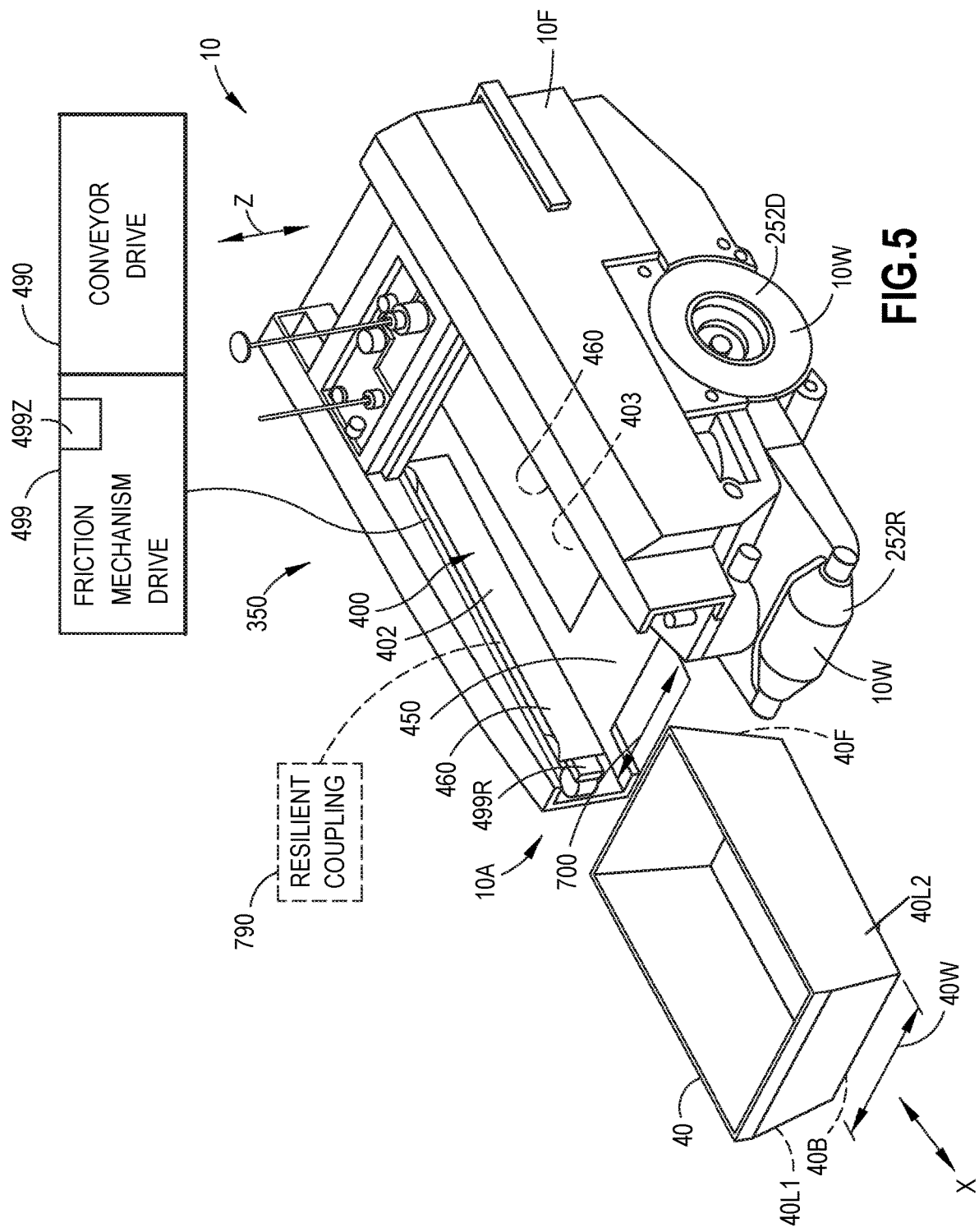

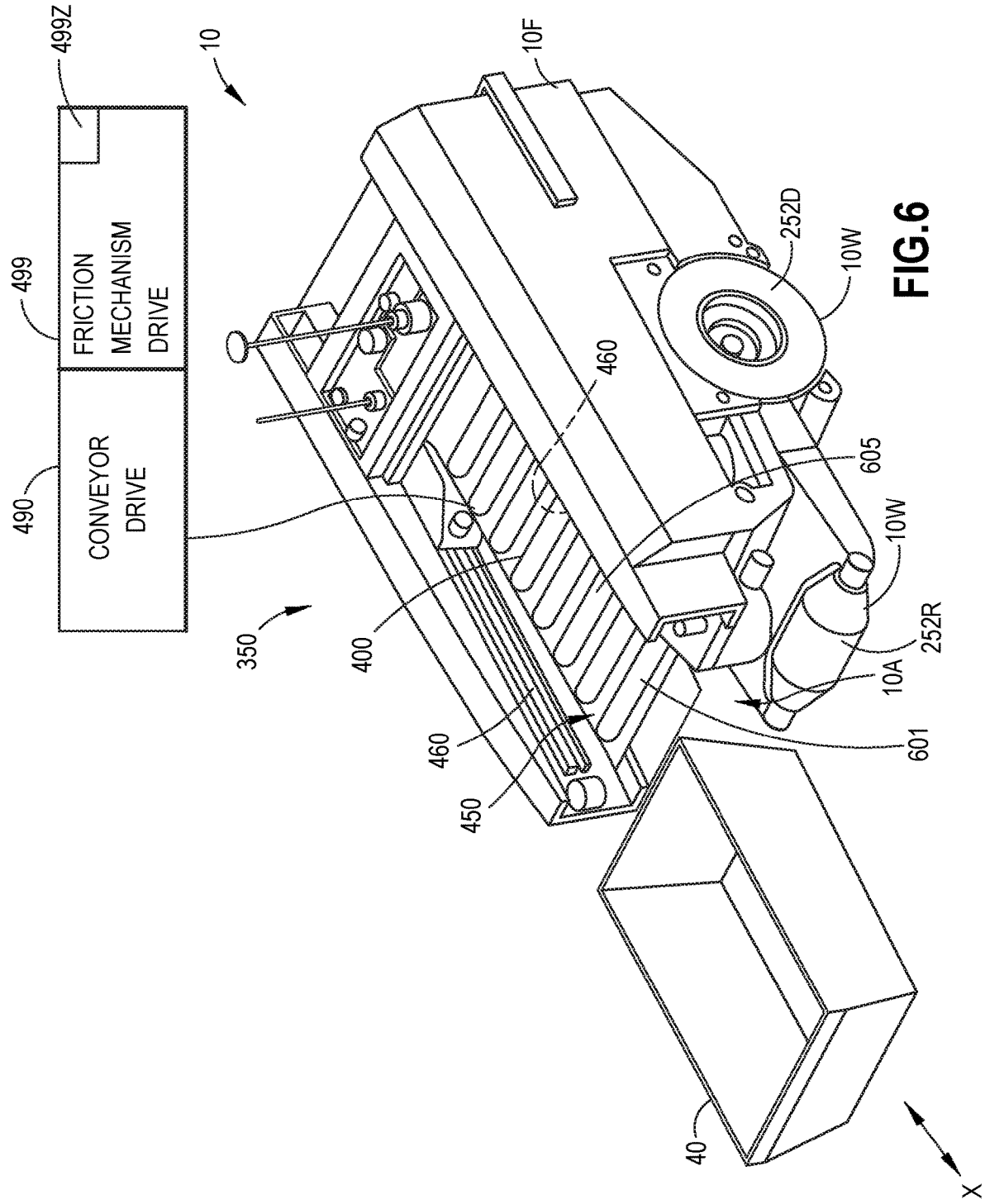

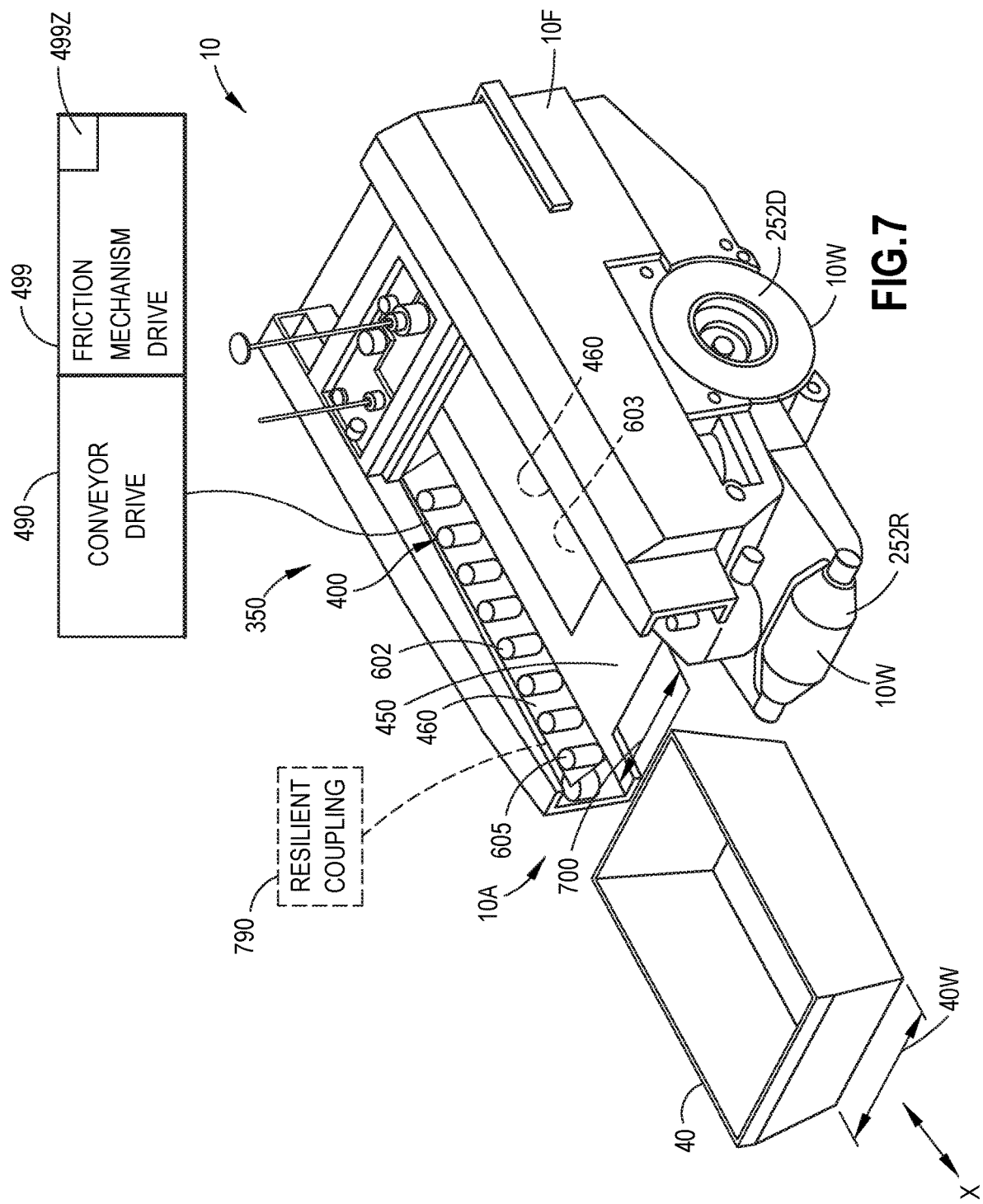

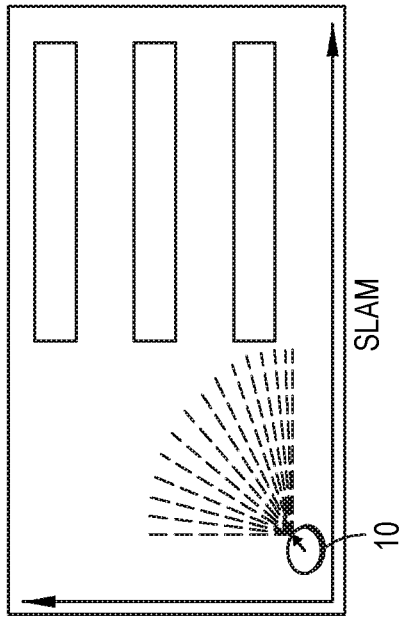
FIG.8 SLAM
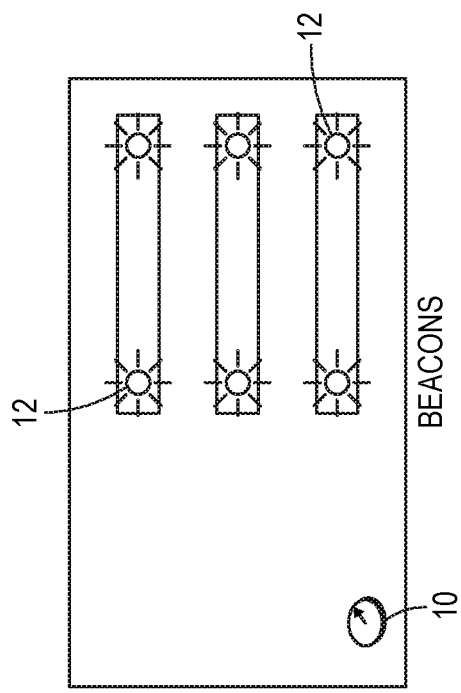
FIG.9 BEACONS
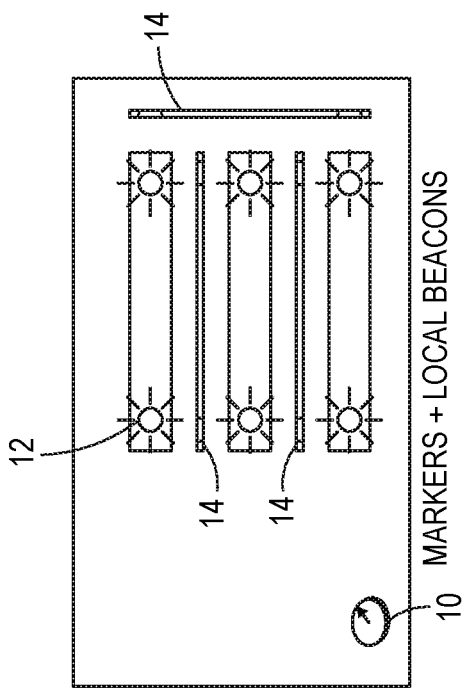
FIG.10 MARKERS + LOCAL BEACONS
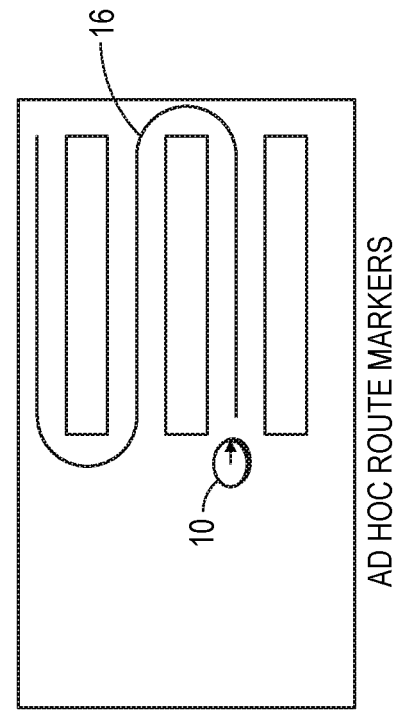
FIG.11 AD HOC ROUTE MARKERS

METHOD AND SYSTEM FOR AUTOMATED TRANSPORT OF ITEMS

CROSS-REFERENCE TO RELATED APPLICATIONS

This application is a non-provisional of and claims the benefit of U.S. provisional patent application No. 62/718,734 filed on Aug. 14, 2018, the disclosure of which is incorporated herein by reference in its entirety.

BACKGROUND

1. Field

The exemplary embodiment generally relates to transportation of items, more particularly, to the automated transportation of items between multiple points.

2. Brief Description of Related Developments

Generally, when cases of products are stored on warehouse shelves manually, the cases of products may substantially abut one another such that there is minimal clearance (e.g., lateral sides of adjacent cases of products are substantially touching each other) between adjacent cases of products on the warehouse shelves. Further, the manual placement of the cases or products on the warehouse shelves may provide for an unpredictable spacing between the adjacent cases of products. The lateral sides of cases of products may not be available for interfacing with automation when picking the cases of products from the warehouse shelves. As such, generally automation that picks the cases of products from the warehouse shelves generally interfaces with (e.g., contacts or grabs) a case of products from the top, the bottom, or the front of the case of products.

The automation for picking the cases or products from the warehouse shelves includes automated robotic mechanisms that employ vacuum-actuated suction cups or pads that lift, drag, or otherwise move the cases of products or individual items in the warehouse. The vacuum is generated by a suction device such that when the vacuum cup or pad comes into contact with a surface that is larger than the vacuum cup or pad, such as a surface of a case of products or other item, a vacuum force sufficient to couple the case of products or the other item to the automated robotic mechanism is created, allowing the automated robotic mechanism to hold and move the case of products or other item until the vacuum source is turned off.

A sufficient vacuum force may not be generated by the vacuum-actuated suction cups or pads to couple the case or products or other item to the automated robotic mechanism may not be created, such as where, cardboard dust or other coating (dirt, dust, etc.) is present on the surfaces of the case of products or other item. The presence of the dust or coating on the surfaces of the case of products or other item may cause the vacuum grip to be lost while moving the case or products or other item.

It would be advantageous to be able to reliably pick cases of products or other items from a warehouse shelf, where the lateral sides of the cases of products or other items are substantially touching (at least the spacing between the lateral sides is unpredictable), with robotic automation employing a vacuum-actuated gripper(s).

BRIEF DESCRIPTION OF THE DRAWINGS

The foregoing aspects and other features of the disclosed embodiment are explained in the following description, taken in connection with the accompanying drawings, wherein:

FIG. 3 is a schematic illustration of a portion of the automated guided vehicle of FIG. 2 in accordance with aspects of the disclosed embodiment;

FIG. 4 is a schematic illustration of the automated guided vehicle of FIG. 2 in accordance with aspects of the disclosed embodiment;

FIG. 5 is a schematic illustration of the automated guided vehicle of FIG. 2 in accordance with aspects of the disclosed embodiment;

FIG. 6 is a schematic illustration of the automated guided vehicle of FIG. 2 in accordance with aspects of the disclosed embodiment;

FIG. 7 is a schematic illustration of the automated guided vehicle of FIG. 2 in accordance with aspects of the disclosed embodiment;

FIG. 8 is a schematic illustration of automated guided vehicle navigation in accordance with aspects of the disclosed embodiment;

FIG. 9 is a schematic illustration of automated guided vehicle navigation in accordance with aspects of the disclosed embodiment;

FIG. 10 is a schematic illustration of automated guided vehicle navigation in accordance with aspects of the disclosed embodiment;

FIG. 11 is a schematic illustration of automated guided vehicle navigation in accordance with aspects of the disclosed embodiment.

DETAILED DESCRIPTION

Figure 1:
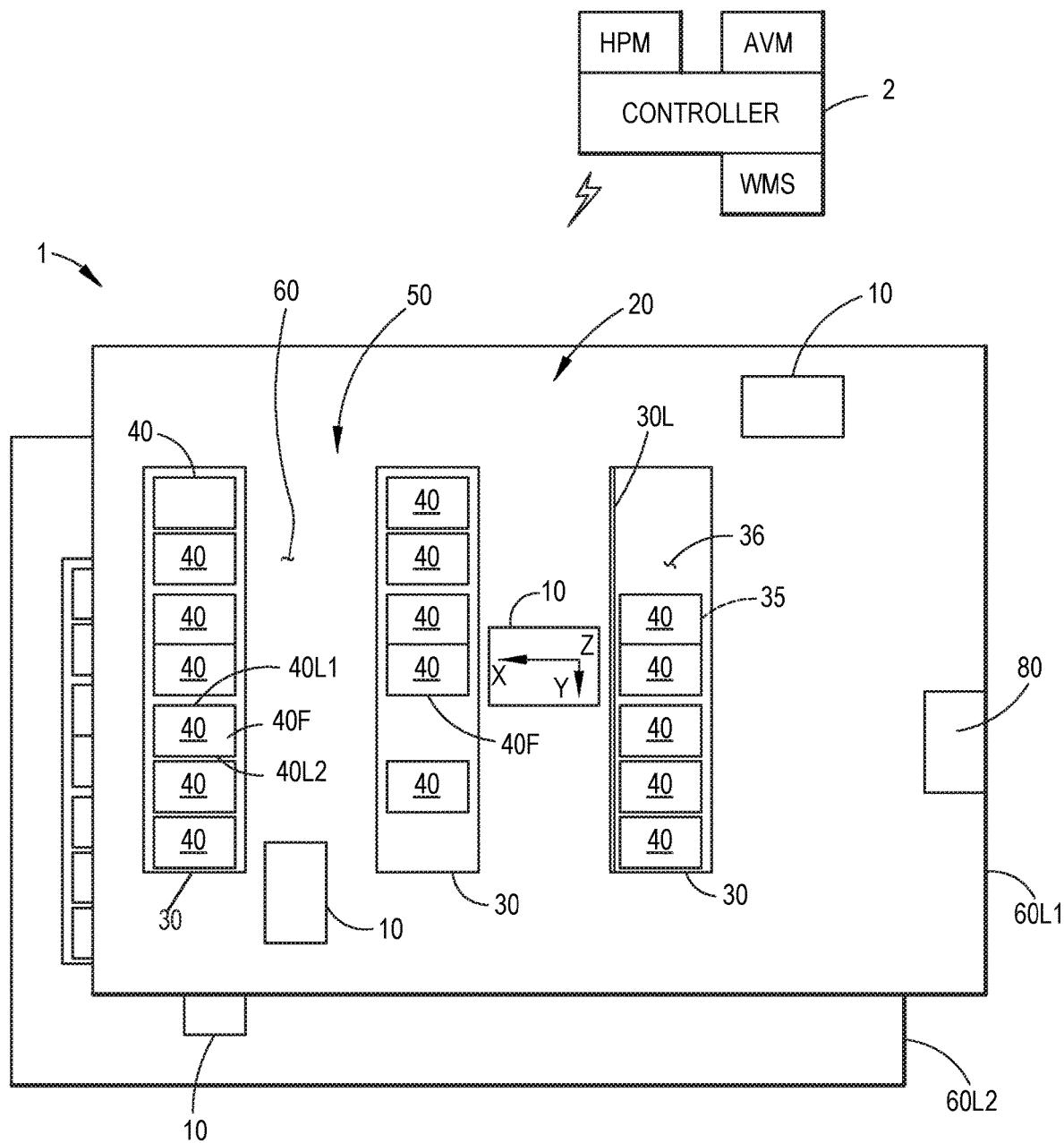
FIG. 1 is a schematic block diagram of a warehouse in accordance with aspects of the disclosed embodiment.

FIG. 1 is a schematic illustration of a distribution center or warehouse 1 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment described herein provide a system for automating order fulfillment, replenishment, and/or returns in a warehouse 1. The aspects of the disclosed embodiment include one or more automated guided vehicles 10 that pick, place or otherwise move storage containers 40 (which hold any suitable products or goods and are configured for placement in a storage space on a storage rack/shelf) from one place to another within the warehouse 1. The automated guided vehicles 10 are deployed in the warehouse structure to move throughout the warehouse 1 for moving the storage containers 40 according to instructions from any suitable controller 2 that is in communication with the automated guided vehicles 10 in any suitable manner (such as for example, through a wireless or wired communication connection). The automated guided vehicles 10 are deployed on a single level 60L1 of the warehouse 1 or on multiple levels 60L1, 60L2 of the warehouse 1. The automated guided vehicles 10 may travel between level in any suitable manner (e.g., elevators, lifts, ramps, etc.) or be confined to a predetermined level 60L1, 60L2.

As can be seen in FIG. 1 the warehouse 1 includes a storage array 20 including one or more storage racks 30. Each of the storage racks 30 includes one or more (e.g. at least one) storage locations positioned on the storage rack 30 in a predetermined location (e.g. predetermined storage locations 35) such that each of the predetermined storage locations 35 is configured to hold or store at least one storage container 40. The storage racks 30 are each configured (e.g., include suitable shelving, etc.) so that the storage containers 40 are placed on the shelf 36 in a tightly packed storage density—where tightly packed storage density refers to placement of containers 40 adjacent one another so that the lateral sides 40L1, 40L2 of the adjacent containers 40 have a minimal clearance between them or are substantially touching one another but can be inserted or removed from the shelf 36 without disturbing a shelf position of adjacent containers. The one or more storage racks 30 are arranged so as to form aisles 50 between the storage racks 30 where the predetermined storage locations 35 (and hence the storage containers 40) are arranged along the aisles 50.

Figure 2:
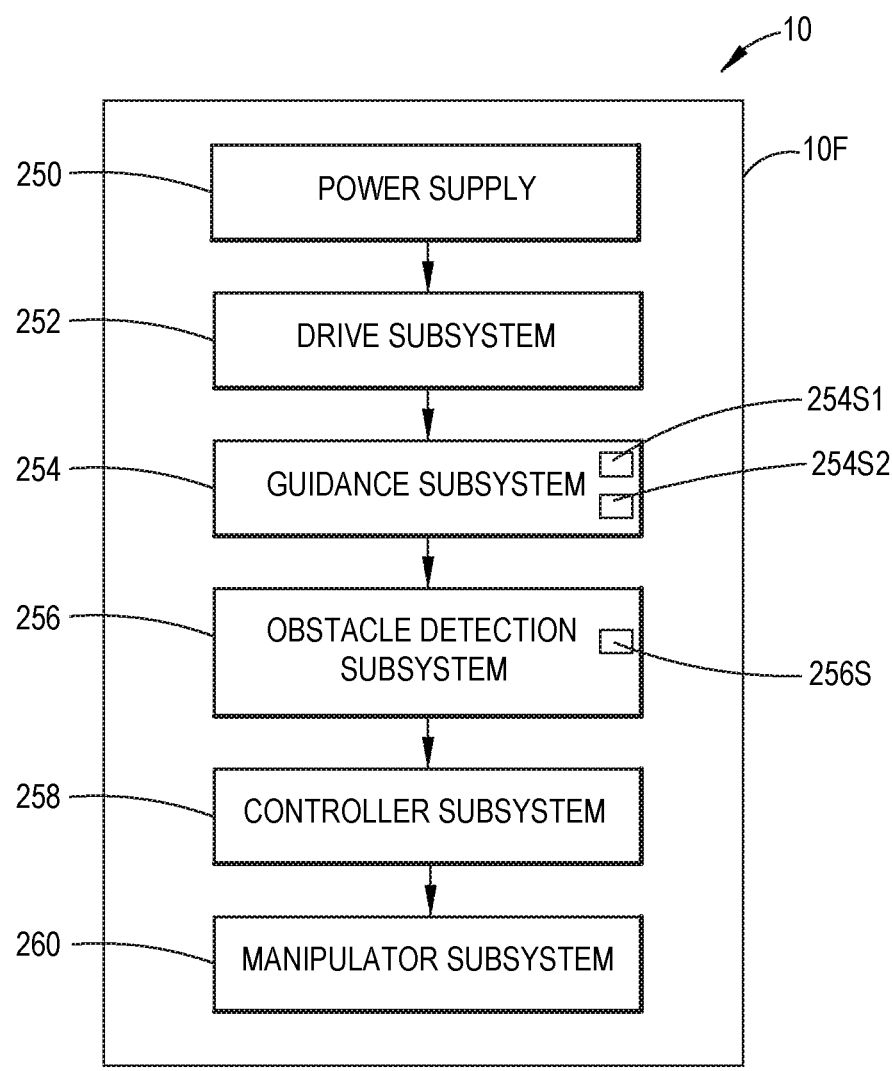
FIG. 2 is a schematic block diagram of an automated guided vehicle in accordance with aspects of the disclosed embodiment.

Referring now to FIGS. 2 and 3 each automated guided vehicle 10 includes a frame 10F, a plurality of wheels 10W (at least one of which is a drive wheel 252D) and a gripper/manipulator or effector 10A. In one aspect the gripper 10A includes a vacuum case transfer mechanism 300 and a friction case transfer mechanism 310. The gripper 10A is movable (e.g. the gripper 10A is part of a movable container grip or container manipulator subsystem 260) that is configured to engage the storage containers 40 so as to pick and place one of the storage containers 40 to and from a storage location 35 on the racks 30 (e.g., transfer the storage container 40 to and from a payload area 350 of the frame 10F). The vacuum case transfer mechanism 300 includes at least one degree of freedom for effecting transfer of storage containers 40 to and from the automated guided vehicle 10. In one aspect, the vacuum case transfer mechanism 300 includes a vacuum gripping member 302 that includes at least one suction cup 301 (or suction pad 301P). Any suitable vacuum source 305 is communicably coupled to the at least one suction cup 301 to generate a suction force between the at least one suction cup 301 and a storage container 40. The vacuum gripping member 302 is configured to extend from and retract into the payload area 350 in any suitable manner. For example, the vacuum gripping member 302 may be movably coupled to the frame 10F by rails 320 so that the vacuum gripping member extends in the X direction (where containers 40 are transferred to and from the payload area 350 along the X direction). It is noted that the X direction is shown as being coincident with a longitudinal path of travel of the automated guided vehicle 10 and the Y axis is transverse to X axis, but in other aspects containers 40 may be transferred to and from the payload area 350 in a direction transverse to the direction of travel of the automated guided vehicle 10. The manipulator subsystem 260 may include any suitable vacuum gripper drive 311 for effecting movement of the vacuum gripping member 302 along the rails 320.

In one aspect, the vacuum gripper drive 311 includes at least two degrees of freedom for effecting movement of the vacuum gripping member 302. For example, in one aspect the vacuum gripper drive 311 includes any suitable Z axis drive 3112. The Z axis drive 3112 may be employed where the shelves 36 (e.g., including flow rack shelves) of the racks 30 have a lift-over edge or lip 30L on a side of the shelves 36 facing the aisle 50 that prevents the containers 40 from sliding off of the shelves 36. The Z axis drive 3112 is configured to effect Z axis movement of the vacuum gripping member 302 so as to lift a container 40, gripped by the vacuum gripping member 302, over the lip 30L so that the container 40 may be transferred (e.g., drawn or pulled) over the lip 30L into the payload area 350.

In one aspect, the friction mechanism drive 499 includes at least two degrees of freedom for effecting movement of the friction gripper. For example, in one aspect the friction mechanism drive 499 includes any suitable Z axis drive 499Z. The Z axis drive 499Z may be employed where the shelves 36 (e.g., including flow rack shelves) of the racks 30 have a lift-over edge or lip 30L on a side of the shelves 36 facing the aisle 50 that prevents the containers 40 from sliding off of the shelves 36. The Z axis drive 499Z is configured to effect Z axis movement of the friction gripper (as described herein) of the friction mechanism drive 499 so as to lift a container 40, gripped by the friction gripper, over the lip 30L so that the container 40 may be transferred (e.g., drawn or pulled) over the lip 30L into the payload area 350.

Referring also to FIGS. 4-7, the friction case transfer mechanism 310 at least cooperates with the vacuum case transfer mechanism 300 for transferring containers 40 to and from the payload area 350 (e.g., transferring containers 40 to and from the storage racks 30). The friction case transfer mechanism 310 includes, in one aspect, actuable gripping members 370, 371 (FIG. 3) that pivot about respective axes Z1, Z2 to grip lateral sides 40L1, 40L2 of a container 40 being transferred to or from the payload area 350. In one aspect, the actuable gripping members 370, 371 may be coupled to the vacuum gripping member 302 so as to move as a unit with the vacuum gripping member 302 along the rails 320. In another aspect, the actuable gripping member 370, 371 may be coupled to the frame 10F so as to move in the X direction independent of the vacuum gripping member 302. For example, the actuable gripping members 370, 371 may be coupled to rails 321 and be driven by any suitable gripping member drive 312 of the manipulator subsystem 260. In this aspect, the vacuum gripping member 302 may extend to grip the container 40 by suction and retract towards the payload area 350 to expose the lateral sides 40L1, 40L2 of the container 40 from between adjacent containers 40 (e.g., located alongside the respective lateral sides 40L1, 40L2) disposed on the shelf 36. The actuable gripping members 370, 371 may pivot about the respective axes Z1, Z2 so as to grip the exposed lateral sides 40L1, 40L2 to at least assist/cooperate with the vacuum gripping member 302 to transfer the container 40 into the payload area 350 (e.g., so that the container 40 is transferred to the payload area 350 substantially regardless of any loss of suction between the vacuum gripping member 302 and the container 40).

In one aspect, the actuable gripping members 370, 371 may be biased about the respect axes Z1, Z2 so that a free end 370E, 371E is biased outward to increase a distance 396 between the free ends 370E, 371E when the actuable gripping members 370, 371 extend from the frame 10F. The frame 10F may include any suitable cam surface(s) 397 that engage the respective actuable gripping members 370, 371 as the actuable gripping members 370, 371 are retracted into the payload area 350. The cam surfaces 397 engage the respective actuable gripping members 370, 371 so as to pivot the free ends 370E, 371E towards the centerline 399 of the payload area 350 to decrease the distance 396 between the free ends 370E, 371E and grip the lateral sides 40L1, 40L2 of the container 40. In other aspects, any suitable drive may be provided to pivot the actuable gripping members 370, 371 about the respective axes Z1, Z2.

The actuable gripping members 370, 371 may effect placement of the container 40 at a predetermined lateral position relative to, for example, the centerline 399 of the payload area 350. Locating the container 40 at the predetermined lateral position (e.g., such that a longitudinal centerline 40CL (FIG. 4) of the container 40 is substantially aligned with the longitudinal centerline 399 of the payload area 350) locates the container 40 relative to the automated guided vehicle 10 so that the container 40 can be placed on a shelf 36 in a known/predetermined location (e.g., to place the containers 40 on the shelf 36 in a tightly packed storage density—where tightly packed storage density refers to placement of containers 40 adjacent one another so that the lateral sides 40L1, 40L2 of the adjacent containers 40 have a minimal clearance between them or are substantially touching one another but can be inserted or removed from the shelf 36 without disturbing a shelf position of adjacent containers).

In another aspect, the friction case transfer mechanism 310 includes at least one conveyor 400 (e.g., friction gripper, which in the case of a conveyor belt the friction gripper may be referred to as is a "continuous loop friction gripper", and in the case of a roller conveyor the friction gripper may be referred to as a "interrupted roller friction gripper" having spaced apart friction rollers) disposed on one or more of a payload area bed 450 and a payload area lateral side 460. In one aspect, the at least one conveyor 400 may be employed with the actuable gripping members 370, 371; while in other aspects the at least one conveyor 400 may be employed without the actuable gripping members 370, 371. Referring to FIGS. 4 and 5, in one aspect, the at least one conveyor 400 is a conveyor belt 401 that forms the payload area bed 450. The conveyor belt 401 is driven in any suitable manner by any suitable conveyor drive 490 of the manipulator subsystem 260. In another aspect, the at least one conveyor 400 includes conveyor belts 402, 403 that are disposed on respective lateral sides 460 of the payload area 350. The conveyor belts 402, 403 may be driven by the conveyor drive 490 in any suitable manner. In another aspect, the friction case transfer mechanism 310 includes the conveyor belt 401 and the conveyors belts 402, 403. In this aspect, the vacuum gripping member 302 may extend to grip the container 40 by suction and retract towards the payload area 350. As the container 40 is retracted into the payload area 350 by the vacuum gripping member 302, one or more of the lateral sides 40L1, 40L2 and the bottom 40B of the container engage(s) one or more of the respective conveyor belts 401, 402, 403 (where the conveyor belt 401 is provided the bottom 40B of the container engages the conveyor belt 401; where the conveyors belts 402, 403 are provided the lateral sides 40L1, 40L2 engage the respect conveyor belts 402, 403; where the conveyor belts 401, 402, 403 are provided the bottom 40B and lateral sides 40L1, 40L2 engage the respective conveyor belts 401, 402, 403), where one or more of the conveyor belts 400, 401, 402 at least assist/cooperate with the vacuum gripping member 302 to transfer the container 40 into the payload area 350 (e.g., so that the container 40 is transferred to the payload area 350 substantially regardless of any loss of suction between the vacuum gripping member 302 and the container 40).

In one aspect, the friction case transfer mechanism 310 includes a friction mechanism drive 499 that, in one aspect, is a part of the drive subsystem 252. The conveyor belt 401 and/or conveyor belts 402, 403 (or roller conveyor(s) 601, 602, 603 or other suitable friction members) may be coupled to the frame 10F by any suitable sliding rails 499R that telescope, under motive force provided by the friction mechanism drive 499, to extend the conveyor belt 401 and/or conveyor belts 402, 403 (or roller conveyor(s) 601 or other suitable friction members) from and retract the conveyor belt 401 and/or conveyor belts 402, 403 (or roller conveyor(s) 601 or other suitable friction members) into the payload area 350. Here, the conveyor belt 401 and/or conveyor belts 402, 403 (or roller conveyor(s) 601 or other suitable friction members) may extend from the payload area to engage (e.g., frictionally grip) a container 40 in lieu of or with the actuable gripping members 370, 371 and move the container 40 X direction into the payload area 350. In one aspect, to move the container 40 into the payload area 350 the conveyor belt 401 and/or conveyor belts 402, 403 (or roller conveyor(s) 601 or other suitable friction members) are driven by conveyor drive 490 to move the container into the payload area 350 in the X direction in conjunction with movement of the conveyor belt 401 and/or conveyor belts 402, 403 (or roller conveyor(s) 601 or other suitable friction members) along the sliding rails 499. In one aspect, to move the container 40 out of the payload area 350 the conveyor belt 401 and/or conveyor belts 402, 403 (or roller conveyor(s) 601 or other suitable friction members) are driven by conveyor drive 490 to move the container out of the payload area 350 in the X direction in conjunction with movement of the conveyor belt 401 and/or conveyor belts 402, 403 (or roller conveyor(s) 601 or other suitable friction members) along the sliding rails 499. In other aspects, the conveyor belt 401 and/or conveyor belts 402, 403 (or roller conveyor(s) 601 or other suitable friction members) may not move along the sliding rails to move the container 40 into and out of the payload area 350.

Referring to FIGS. 6 and 7, in one aspect, the at least one conveyor 400 is a roller conveyor 601 that forms the payload area bed 450. The roller conveyor 601 is driven in any suitable manner by the conveyor drive 490 of the manipulator subsystem 260. In another aspect, the at least one conveyor 400 includes roller conveyors 602, 603 that are disposed on respective lateral sides 460 of the payload area 350. The roller conveyors 602, 603 may be driven by the conveyor drive 490 in any suitable manner. In another aspect, the friction case transfer mechanism 310 includes the roller conveyor 601 and the roller conveyors 602, 603. In this aspect, the vacuum gripping member 302 may extend to grip the container 40 by suction and retract towards the payload area 350. As the container 40 is retracted into the payload area 350 by the vacuum gripping member 302, one or more of the lateral sides 40L1, 40L2 and the bottom 40B of the container engage(s) one or more of the respective roller conveyors 601, 602, 603 (where the roller conveyor 601 is provided the bottom 40B of the container engages the roller conveyor 601; where the roller conveyors 602, 603 are provided the lateral sides 40L1, 40L2 engage the respect roller conveyors 602, 603; where the roller conveyor 601, 602, 603 are provided the bottom 40B and lateral sides 40L1, 40L2 engage the respective roller conveyors 601, 602, 603), where one or more of the roller conveyors 600, 601, 602 at least assist/cooperate with the vacuum gripping member 302 to transfer the container 40 into the payload area 350 (e.g., so that the container 40 is transferred to the payload area 350 substantially regardless of any loss of suction between the vacuum gripping member 302 and the container 40). Each of the roller conveyors 601, 602, 603 includes one or more rollers 605 that is/are rotatably driven by the conveyor drive 490 for transferring the container 40 to and from the payload area 350.

The conveyor belts 402, 403 and/or the roller conveyors 602, 603 may be coupled to the frame 10F by any suitable resilient coupling 790 that biases the conveyor belts 402, 403 or the roller conveyors 602, 603 in the Y direction towards the centerline 399 (FIG. 3) of the payload area 350 so that a distance 700 (FIGS. 5 and 7) between the opposing conveyor belts 402, 403 or opposing roller conveyors 602, 603 is less than a lateral width 40W (FIGS. 5 and 7) of the container 40 so that the conveyor belts 402, 403 and the roller conveyors 602, 603 positively engage the lateral sides 40L1, 40L2 of the container 40 and can accommodate containers 40 having differing lateral widths 40W. The resilient coupling 790 may include springs, resilient foams, and/or other biasing members that bias the opposing conveyor belts 402, 403 and opposing roller conveyors 602, 603 towards each other. The distance 700 between the opposing conveyor belts 402, 403 and opposing roller conveyors 602, 603 may be adjusted (e.g., to allow insertion of the container 40 between the opposing conveyor belts 402, 403 and opposing roller conveyors 602, 603) depending on the lateral width 40W of the containers 40 to be transferred by the automated guided vehicle 10. Where the conveyor belt 401 or roller conveyor 601 are employed as the payload area bed 450 the automated guided vehicle 10 may transfer containers having any suitable lateral widths 40W (e.g., containers 40 with varying lateral widths 40W may be transferred substantially without any adjustments to the automated guided vehicle 10—the manipulator subsystem 260 dynamically and automatically adjusts for various size containers). As may be realized, a gripping surface (such as the front face 40F, facing the aisle 50, of the container 40) of the container 40 is larger than a suction area formed by the suction cup(s) 301 or suction pad 301P.

It is noted that the aspects of the disclosed embodiment described herein with respect to FIGS. 3-7 may be used in any suitable combination. For exemplary purposes only (as other combinations of features may exist within the scope of the aspects of the invention), the conveyor belt 401 may be employed in conjunction with conveyor belts 402, 403; the conveyor belt 401 may be employed in conjunction with roller conveyor 602, 603; the conveyor belts 402, 403 may be employed with roller conveyor 601; the actuable gripping members 370, 371 may be employed in conjunction with one or more of the conveyor belts 401-403 and roller conveyors 601-603; and vacuum gripping member 302 may be employed with one or more of the actuable gripping members 370, 371, the conveyor belts 401-403, and the roller conveyors 601-603.

Referring to FIGS. 2 and 8-11, each automated guided vehicle 10 also includes a drive subsystem 252, a guidance subsystem 254, an obstacle detection subsystem 256, a controller subsystem 258 and a power supply 250. The subsystems of the automated guided vehicle 10 include sensors, as will be described below, that provide the automated guided vehicle awareness of (e.g. the ability to detect) the environment around the automated guided vehicle 10 so that the automated guided vehicle knows its position and orientation with respect to the warehouse substantially at all times. For example, the automated guided vehicles know their surrounding at a time where the automated guided vehicles receive a command from, for example, the controller 2 for picking and transporting a storage container 40 and prior to navigating. Based on the awareness of its surroundings the automated guided vehicle 10 selects a path 75 based on any suitable optimizing algorithm resident in, for example, controller subsystem 258 of the automated guided vehicle 10 and then iteratively updates the path (e.g. the path is changed from the selected path as needed) based on, for example, information obtained from the automated guided vehicle sensors and any detected obstacles, transients and waypoints, such as in a manner described in U.S. patent application Ser. No. 14/972,722 filed on Dec. 17, 2015 entitled "Method and System for Automated Transport of Items", the disclosure of which is incorporated herein in its entirety.

As may be realized, the sensors provide alignment between the automated guided vehicles 10 and the storage containers 40 and/or storage spaces 35 to or from which a storage container 40 is picked or placed. The sensors also prevent the automated guided vehicle 10 from colliding with other automated guided vehicles 10, warehouse equipment (e.g. such as racks, forklifts, etc.), humans or other obstacles. As may be realized, although humans are not required to be in the storage aisles 50 while the automated guided vehicles 10 are moving storage containers 40 within the aisles 50 and other portions of the warehouse 1, the aspects of the disclosed embodiment do not restrict human access within zones of movement of the automated guided vehicles 10 during operation of the automated guided vehicles 10. The fully autonomous nature of the automated guided vehicles 10 does not require substantially any mechanical structure to contain the automated guided vehicles or in other words, the operation of the automated guided vehicles 10 does not hinder human access to the storage spaces and vice versa (the automated guided vehicles comingle with humans in a common space of the automated storage system).

The power supply is any suitable power supply, such as a rechargeable power supply, configured to provide power to the automated guided vehicle and all of its subsystems 252, 254, 256, 258, 260. The controller subsystem 258 is any suitable control system such as a microprocessor-based controller subsystem configured to control operation of the automated guided vehicle 10 in performing programmed behaviors such as those described herein. The controller subsystem 258 is configured (e.g., programmed) to perform various functions, including effecting the transport of items with the automated guided vehicle 10 between endpoints. The controller subsystem 258 is connected to and responsive to the output of guidance subsystem 254 and the output of obstacle detection subsystem 256. The controller subsystem 258 controls the drive subsystem 252 to maneuver the automated guided vehicle 10 (as described herein) to prescribed endpoint locations such as one or more predetermined storage spaces 35 and an order filling station 80. The controller subsystem 258 is also connected to a manipulator subsystem 260 (of which the gripper 10A is a part of) such that the manipulator subsystem 260 is commanded by the controller subsystem 258 to pick or place a container 40 with the gripper 10A from any suitable container holding location.

The controller subsystem 258 is connected to the controller 2 in any suitable manner such as through a wired or wireless connection for receiving storage container picking/placing and transport commands from the controller 2. For example, in one aspect the controller 2 includes warehouse management system WMS configured to receive orders and to identify storage containers 40 (that include products associated with the orders) and the corresponding storage locations 35 for the identified storage containers 40. In one aspect the controller 2 also includes, or is otherwise connected to, an automated guided vehicle manager AVM that is configured to command the automated guided vehicles 10 so that the automated guided vehicles 10 traverse the floor 60, of the respective level 60L1, 60L2, to the corresponding storage locations 35 for picking at least one of the identified storage container 40. In one aspect, the automated guided vehicle manager AVM is in communication with the automated guided vehicles 10 in any suitable manner, such as a wired or wireless connection. In one aspect, the controller 2 also includes an automated human picker manager HPM communicably connected with at least one human picker HP. The automated human picker manager HPM is in communication with the automated guided vehicle manager AVM and is configured to command the at least one human picker to work in concert with the at least one autonomous guided vehicle 10 in any suitable manner such as described in, for example, U.S. provisional patent application No. 62/063,825 filed on Oct. 14, 2014 and entitled "Storage Material Handling System", the disclosure of which is incorporated herein by reference in its entirety.

The drive subsystem 252 is mounted to the frame (and which includes wheels 10W, at least one of which is a drive wheel 252D) for maneuvering the frame 10F (and hence the automated guided vehicle 10). In one aspect the drive subsystem 252 is a differential drive system having two independently operable coaxial drive wheels 252D and at least one roller wheel 252R (FIGS. 3-7) for balance or support of the frame 10F. The drive wheels 252D are driven together or independently by one or more motors and any suitable drive transmission controlled by, for example, the controller subsystem 258. In other aspects, the drive subsystem 252 includes steered wheels or any other suitable drive configuration for effecting movement of the automated guided vehicle 10 through the warehouse 1.

The guidance subsystem 254 is mounted to the frame 10F for interacting with the drive subsystem 252 and is configured to effect navigation of the automated guided vehicle 10 in any suitable manner such as those described in U.S. Pat. No. 8,676,425 and U.S. patent application Ser. No. 13/285,511 filed on Oct. 31, 2011 the disclosures of which are incorporated herein by reference in their entireties. Referring also to FIG. 6, in one aspect the guidance subsystem includes a simultaneous location and mapping (SLAM) navigation system that provides the automated guided vehicle 10 a global coordinate or reference frame REF with respect to the warehouse 1. Here the automated guided vehicle guidance is effected through a coordinate system that lacks physical markers or beacons.

Referring also to FIGS. 8-11, in one aspect, the guidance subsystem 254 includes one or more of a marker detecting sensor(s) 254S1 and/or a beacon sensor(s) 254S2. In one aspect the marker detecting sensor(s) 254S1 are configured to detect the position of a marker such as a retro-reflective tape (or other suitable marker such as a capacitive or inductive marker or other optical marker including but not limited to barcodes) laid on the floor 60 (e.g. on the undeterministic traverse surfaces 60S and/or on any other suitable surface such as the walls of the warehouse 1 and/or on the racks 30. In one aspect the marker detecting sensor(s) 254S2 include one or more of a photodiode-based sensor, one or more radiation sources (e.g., LEDs), inductive sensors, capacitive sensors, barcode reader, etc. to detect the marker. In one aspect the beacon sensor 254S2 includes any suitable transmitter and/or receiver configured to actively or passively detect any suitable radio frequency beacons 12 (or other suitable beacon such as an infrared, laser or other optical beacon) in, for example, a manner described in U.S. patent application Ser. No. 14/972,722, previously incorporated by reference herein. As can be seen in FIG. 9, for example, the guidance subsystem 254 includes a plurality of active (e.g. having a radio frequency or other (e.g., infrared) beacon transmitter) or passive (e.g. configured to passively return a signal) beacons or tags 12 that are located at any suitable location of the warehouse 1 (such as on the racks, on walls, on the floor 60, ceiling, etc.). In this case, the beacon sensor(s) 254S2 are configured to detect signals from beacons or detect the beacons themselves for locating the automated guided vehicle 10 relative to the storage spaces 35, the racks 30, the order filling stations 80 and any other suitable structure of the warehouse 1. By way of example, where beacons 12 are used, each automated guided vehicle 10 should secure a line of sight to one or more beacons 12, for example, an origin and/or destination beacon could be visible (either optically or through radio waves) to the automated guided vehicle 10 for at least a period of time. The automated guided vehicle 10 moves directly from one beacon (e.g. the origin beacon) toward the other (e.g. the destination beacon) unless an obstacle intervenes as described herein. In one aspect each beacon 12 establishes a respective coordinate system, where the beacon is the origin of the respective coordinate system. Angular encoding (or any other suitable encoding) is employed to specify the axes of the beacon coordinate system. The beacon coordinate system enables robots to queue along a particular ray whose origin is the beacon. Angle encoding can also enable other useful properties.

Referring to FIG. 10, in one aspect, the guidance subsystem 254 includes shorter range active or passive beacons 12 (which are substantially similar to those described above) and pathways established by any suitable markers 14 (such as those described above) attached to, for example, the floor and/or other suitable surface (e.g. walls, racks, etc.) so that the automated guided vehicles are provided with a rough global reference frame REF. Here the beacon 12 and marker 14 arrangement simplifies sensor range requirements compared to SLAM navigation. Referring also to FIG. 11 the guidance subsystem 254 includes, in one aspect, an ad hoc marker system including one or more markers 16 laid on the floor and/or other suitable surface (e.g. walls, racks, etc.), in some cases temporarily. A route marker 14 indicating an automated guided vehicle 10 path is employed in situations where either a line of sight between beacons does not exist or traveling in a straight path between beacons is not desired. For example, a route marker enables an automated guided vehicle 10 to avoid a ditch at a construction site. As may be realized, the automated guided vehicle 10 can illuminate, for example, a tape or line using, e.g., conventional IR LEDs. In aspect the automated guided vehicle 10 detects the tape or line using a position-sensitive detector composed of discrete components (i.e., not a camera) to servo on the tape or line. The detector measures the degree of retro-reflectivity in view to eliminate false positives. In one aspect, the automated guided vehicle 10 servo on the line directly. In one aspect, the automated guided vehicle 10 can servo at any selected offset with respect to the line. Offset servoing enables two important properties. When placing the line to mark the automated guided vehicle 10 path, workers need not allow space between line and objects. Any time the automated guided vehicle 10 finds its path partially blocked by an object, the automated guided vehicle 10 will increase its offset from the line so that it can follow the line without colliding with the object. A second feature enabled by offset following allows two automated guided vehicles 10 that meet while traveling along the line in opposite directions to avoid collision. When the automated guided vehicles 10 determine that a collision is imminent, each can offset its position relative to the line. The automated guided vehicles 10 can thus pass without obstructing each other.

In one aspect, referring also to FIG. 2 the controller subsystem 258 is connected to an obstacle detection subsystem 256 of the automated guided vehicle 10. The obstacle detection subsystem 256 includes one or more optical, capacitive, inductive, etc. sensors 256S configured to detect other robots and obstacles (e.g. such as walls, racks, human pickers, etc.) within the warehouse 1 in a manner substantially similar to that described in U.S. patent application Ser. No. 14/972,722, previously incorporated by reference herein.

Figure 12:
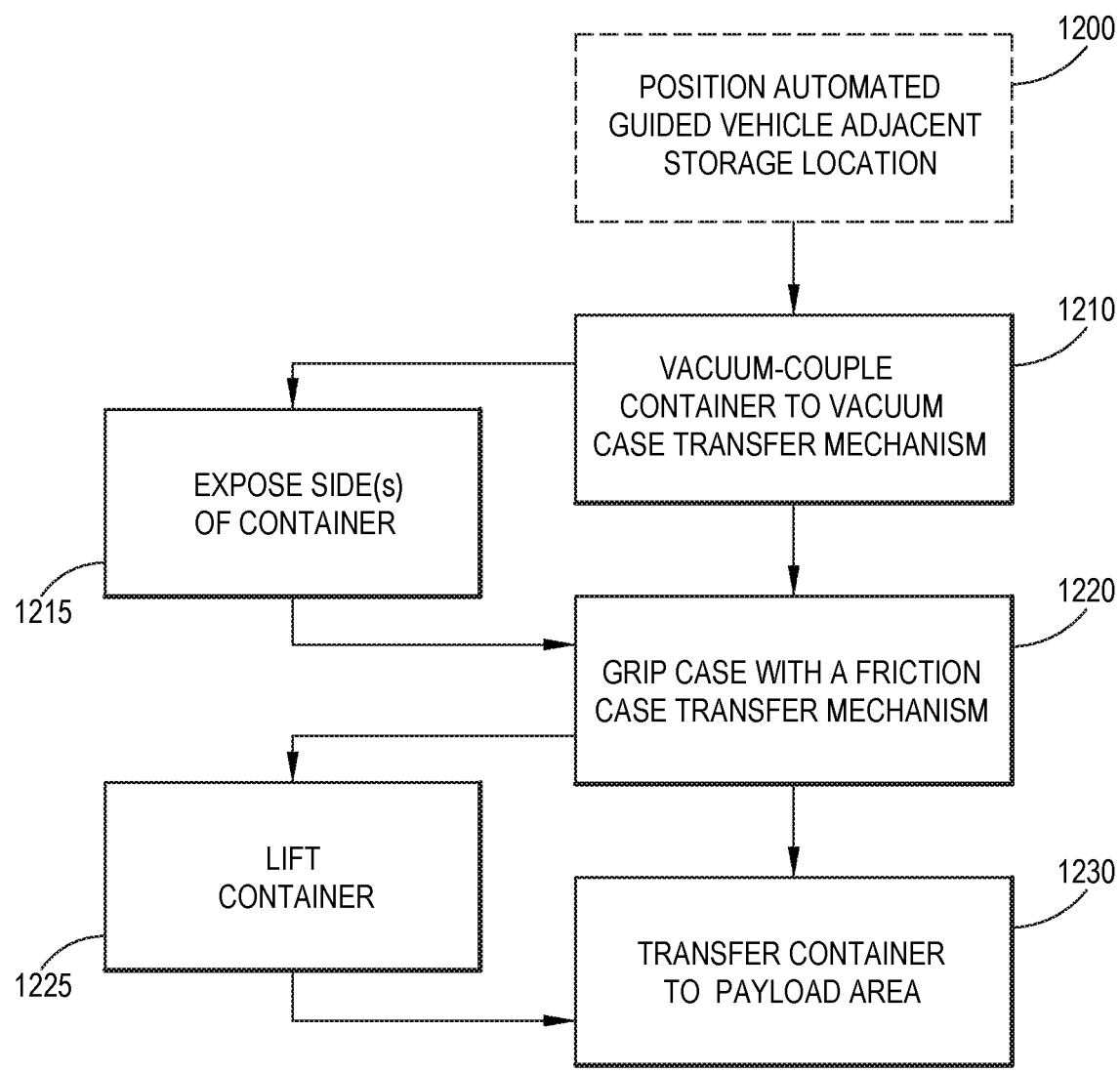
FIG. 12 is a flow diagram of a method in accordance with aspects of the disclosed embodiment.

In accordance with aspects of the disclosed embodiment an exemplary method of transferring containers 40 between the automated guided vehicle 10 and the shelves 36 will be described. Referring to FIGS. 1, 3-7, and 12, the automated guided vehicle 10 is positioned in any suitable manner adjacent a storage location 35 (FIG. 12, Block 1200). For example, the controller 2 may issue a command to the automated guided vehicle to pick a predetermined container 40 from a predetermined storage location 35 on a shelf 36 of a storage rack 30. The container 40 is vacuum coupled to the vacuum case transfer mechanism 300 of the automated guided vehicle (FIG. 12, Block 1210). The container 40 is vacuum coupled to the vacuum case transfer mechanism 300 where, for example, the vacuum gripping member 302 is extended at least partially from the payload area 350 to engage the front surface 40F of the container 40 disposed on the shelf 36. The vacuum source 305 is activated so that the vacuum force is created between the suction cup(s) 301 or suction plate 301P and the front surface 40F of the container 40. The vacuum gripping member 302 is retracted at least partially into or at least towards the payload area 350, with the container 40 vacuum-coupled thereto. In one aspect, retracting the vacuum gripping member 302 with the container 40 vacuum-coupled thereto pulls the container 40 from, for example, the tightly packed storage density of the racks 30, so as to expose the lateral sides 40L1, 40L2 and/or the bottom 40B of the container (FIG. 12, Block 1215) so that the container 40 is gripped with the friction case transfer mechanism 310 of the automated guided vehicle 10 (FIG. 12, Block 1220) in the manner described above. In other aspects, the vacuum gripping member 302 is retracted into the payload area 350, with the container 40 vacuum-coupled thereto so that the container 40 is gripped with the friction case transfer mechanism 310 of the automated guided vehicle 10 (FIG. 12, Block 1220) in the manner described above. As described herein, in one or more aspects, the friction case mechanism 310 may be extended from the payload area 350 to grip the exposed side(s) of the container 40; while in other aspects, the friction case mechanism 310 may not be extended from the payload area 350 such that the vacuum gripping member 302. The friction case transfer mechanism 310 at least cooperates with the vacuum case transfer mechanism 300 to effect transferring the container 40 to the payload area 350 (FIG. 12, Block 1230) of the automated guided vehicle 10. In one aspect, the vacuum case transfer mechanism 300 and/or the friction case transfer mechanism 310 lifts the container 40 (FIG. 12, Block 1225) as described herein to transfer the container 40 into the payload area 350. As described above, in one aspect, the automated guided vehicle 10 picks and transfers dynamically sized containers 40 (or other objects) from a shelf 36 or other platform that supports the containers 40. As may be realized, transfer of the container 40 from the payload area 350 of the automated guided vehicle 10 to the storage locations (e.g., in one aspect, tightly packed storage locations) of the rack 30 may occur in a substantially opposite manner to that described above.

In accordance with one or more aspects of the disclosed embodiment an automated guided vehicle is provided. The automated guided vehicle comprises:
 a frame forming a payload area;
 a vacuum case transfer mechanism having one or more degrees of freedom and configured to vacuum-couple with a case; and
 a friction case transfer mechanism that is configured to grip the case and at least cooperate with the vacuum case transfer mechanism to effect transfer of the case to the payload area.

In accordance with one or more aspects of the disclosed embodiment the vacuum case transfer mechanism includes one or more of a vacuum suction cup and a vacuum suction pad.

In accordance with one or more aspects of the disclosed embodiment the friction case transfer mechanism includes one or more of a driven roller, a conveyor belt, and actuable gripping members.

In accordance with one or more aspects of the disclosed embodiment, the friction case transfer mechanism includes actuable gripping members that pivot to engage one or more sides of the case.

In accordance with one or more aspects of the disclosed embodiment, the actuable gripping members are configured to position the case relative to a centerline of the payload area.

In accordance with one or more aspects of the disclosed embodiment, the vacuum case transfer mechanism includes a vacuum gripping member configured to extend from and retract into the payload area.

In accordance with one or more aspects of the disclosed embodiment, the friction case transfer mechanism includes a friction gripper configured to extend from and retract into the payload area.

In accordance with one or more aspects of the disclosed embodiment, the vacuum case transfer mechanism includes a vacuum gripping member configured to extend and retract relative to the frame; and the friction case transfer mechanism includes a friction gripper configured to extend and retract relative to the frame; where the vacuum gripping member is configured to extend and retract relative to the frame independent of extension and retraction of the friction gripper and the friction gripper is configured to extend and retract relative to the frame independent of extension and retraction of the vacuum gripping member.

In accordance with one or more aspects of the disclosed embodiment, the friction case transfer mechanism comprises: a friction gripper; and a resilient coupling configured to bias the friction gripper towards a centerline of the payload area.

In accordance with one or more aspects of the disclosed embodiment, the vacuum case transfer mechanism includes a vacuum gripping member configured to extend and retract relative to the frame; the friction case transfer mechanism includes a friction gripper configured to extend and retract relative to the frame; and the automated guided vehicle further comprises a lift axis drive configured to lift one or more of the vacuum gripping member and the friction gripper relative to the frame.

In accordance with one or more aspects of the disclosed embodiment a method for transferring cases with an automated guided vehicle is provided. The method comprises:
 vacuum-coupling a case to a vacuum case transfer mechanism of the automated guided vehicle; and gripping the case with a friction case transfer mechanism of the automated guided vehicle, where the friction case transfer mechanism at least cooperates with the vacuum case transfer mechanism to effect transferring the case to a payload area of the automated guided vehicle.

In accordance with one or more aspects of the disclosed embodiment, the friction case transfer mechanism and the vacuum case transfer mechanism cooperate with each other so as to transfer the case to the payload area substantially regardless of any loss of suction between the vacuum case transfer mechanism and the case.

In accordance with one or more aspects of the disclosed embodiment, the case is gripped by the vacuum case transfer mechanism by one or more of a vacuum suction cup and a vacuum suction pad.

In accordance with one or more aspects of the disclosed embodiment, the case is gripped by the friction case transfer mechanism by one or more of a driven roller, a conveyor belt, and actuable gripping members.

In accordance with one or more aspects of the disclosed embodiment, the friction case transfer mechanism includes actuable gripping members that pivot to engage one or more sides of the case.

In accordance with one or more aspects of the disclosed embodiment, further comprising positioning the case relative to a centerline of the payload area with the actuable gripping members.

In accordance with one or more aspects of the disclosed embodiment, wherein transferring the case to the payload area includes extending and retracting a vacuum gripping member of the vacuum case transfer mechanism to and from the payload area.

In accordance with one or more aspects of the disclosed embodiment, wherein transferring the case to the payload area includes extending and retracting a friction gripper of the friction case transfer mechanism to and from the payload area.

In accordance with one or more aspects of the disclosed embodiment, the vacuum case transfer mechanism includes a vacuum gripping member configured to extend and retract relative to the frame; and the friction case transfer mechanism includes a friction gripper configured to extend and retract relative to the frame; where the vacuum gripping member extends and retracts relative to the frame independent of extension and retraction of the friction gripper and the friction gripper extends and retracts relative to the frame independent of extension and retraction of the vacuum gripping member.

In accordance with one or more aspects of the disclosed embodiment, the friction case transfer mechanism comprises a friction gripper and the method further includes biasing the friction gripper towards a centerline of the payload area with a resilient coupling of the friction case transfer mechanism.

In accordance with one or more aspects of the disclosed embodiment, the vacuum case transfer mechanism includes a vacuum gripping member configured to extend and retract relative to the frame; the friction case transfer mechanism includes a friction gripper configured to extend and retract relative to the frame; and the method further comprises lifting one or more of the vacuum gripping member and the friction gripper relative to the frame with a lift axis drive of the automated guided vehicle.

In accordance with one or more aspects of the disclosed embodiment, a method of transferring cases with an automated guided vehicle is provided. The method comprises:

providing cases on a storage shelf, where the cases are positioned relative to each other on the storage shelf in a tightly packed storage density;

vacuum-coupling a case to a vacuum case transfer mechanism of the automated guided vehicle to expose sides of the coupled case; and gripping at least the lateral sides of the coupled case with a friction case transfer mechanism of the automated guided vehicle.

In accordance with one or more aspects of the disclosed embodiment, the case is gripped by the vacuum case transfer mechanism by one or more of a vacuum suction cup and a vacuum suction pad.

In accordance with one or more aspects of the disclosed embodiment, the case is gripped by the friction case transfer mechanism by one or more of a driven roller, a conveyor belt, and actuable gripping members.

In accordance with one or more aspects of the disclosed embodiment, the friction case transfer mechanism includes actuable gripping members that pivot to engage one or more sides of the case.

In accordance with one or more aspects of the disclosed embodiment, further comprising positioning the case relative to a centerline of the payload area with the actuable gripping members.

In accordance with one or more aspects of the disclosed embodiment, wherein transferring the case to the payload area includes extending and retracting a vacuum gripping member of the vacuum case transfer mechanism to and from the payload area.

In accordance with one or more aspects of the disclosed embodiment, wherein transferring the case to the payload area includes extending and retracting a friction gripper of the friction case transfer mechanism to and from the payload area.

In accordance with one or more aspects of the disclosed embodiment, the vacuum case transfer mechanism includes a vacuum gripping member configured to extend and retract relative to the frame; and the friction case transfer mechanism includes a friction gripper configured to extend and retract relative to the frame; where the vacuum gripping member extends and retracts relative to the frame independent of extension and retraction of the friction gripper and the friction gripper extends and retracts relative to the frame independent of extension and retraction of the vacuum gripping member.

In accordance with one or more aspects of the disclosed embodiment, the friction case transfer mechanism comprises a friction gripper and the method further includes biasing the friction gripper towards a centerline of the payload area with a resilient coupling of the friction case transfer mechanism.

In accordance with one or more aspects of the disclosed embodiment, the vacuum case transfer mechanism includes a vacuum gripping member configured to extend and retract relative to the frame; the friction case transfer mechanism includes a friction gripper configured to extend and retract relative to the frame; and the method further comprises lifting one or more of the vacuum gripping member and the friction gripper relative to the frame with a lift axis drive of the automated guided vehicle.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated guided vehicle comprising:
a frame forming a payload area;
a vacuum case transfer mechanism having one or more degrees of freedom and configured dependent to and extending from the payload area along an extension axis to vacuum-couple with a case; and
a friction case transfer mechanism that is dependent and configured to extend from the payload area along the extension axis independent of the vacuum case transfer mechanism to grip the case and at least cooperate with the vacuum case transfer mechanism to effect transfer of the case to the payload area.

2. The automated guided vehicle of claim 1, wherein the vacuum case transfer mechanism includes one or more of a vacuum suction cup and a vacuum suction pad.

3. The automated guided vehicle of claim 1, wherein the friction case transfer mechanism includes one or more of a driven roller, a conveyor belt, and actuable gripping members.

4. The automated guided vehicle of claim 1, wherein the friction case transfer mechanism includes actuable gripping members that pivot to engage one or more sides of the case.

5. The automated guided vehicle of claim 4, wherein the actuable gripping members are configured to position the case relative to a centerline of the payload area.

6. The automated guided vehicle of claim 1, wherein the vacuum case transfer mechanism includes a vacuum gripping member configured to extend from and retract into the payload area.

7. The automated guided vehicle of claim 1, wherein the friction case transfer mechanism includes a friction gripper configured to extend from and retract into the payload area.

8. The automated guided vehicle of claim 1, wherein:
the vacuum case transfer mechanism includes a vacuum gripping member configured to extend and retract relative to the frame; and
the friction case transfer mechanism includes a friction gripper configured to extend and retract relative to the frame;
where the vacuum gripping member is configured to extend and retract relative to the frame independent of extension and retraction of the friction gripper and the friction gripper is configured to extend and retract relative to the frame independent of extension and retraction of the vacuum gripping member.

9. The automated guided vehicle of claim 1, wherein the friction case transfer mechanism comprises:
a friction gripper; and
a resilient coupling configured to bias the friction gripper towards a centerline of the payload area.

10. The automated guided vehicle of claim 1, wherein:
the vacuum case transfer mechanism includes a vacuum gripping member configured to extend and retract relative to the frame;
the friction case transfer mechanism includes a friction gripper configured to extend and retract relative to the frame; and
the automated guided vehicle further comprises a lift axis drive configured to lift one or more of the vacuum gripping member and the friction gripper relative to the frame.

11. A method for transferring cases with an automated guided vehicle, the method comprising:
vacuum-coupling a case to a vacuum case transfer mechanism of the automated guided vehicle the vacuum case transfer mechanism dependent to and extending from the payload area along an extension axis; and
gripping the case with a friction case transfer mechanism of the automated guided vehicle, where the friction case transfer mechanism is dependent to and extends from the payload area along the extension axis independent of the vacuum case transfer mechanism to at least cooperates with the vacuum case transfer mechanism to effect transferring the case to a payload area of the automated guided vehicle.

12. The method of claim 11, wherein the friction case transfer mechanism and the vacuum case transfer mechanism cooperate with each other so as to transfer the case to the payload area substantially regardless of any loss of suction between the vacuum case transfer mechanism and the case.

13. The method of claim 11, wherein the case is gripped by the vacuum case transfer mechanism by one or more of a vacuum suction cup and a vacuum suction pad.

14. The method of claim 11, wherein the case is gripped by the friction case transfer mechanism by one or more of a driven roller, a conveyor belt, and actuable gripping members.

15. The method of claim 11, further comprising positioning the case relative to a centerline of the payload area with the actuable gripping members.

16. A method of transferring cases with an automated guided vehicle, the method comprising:
providing cases on a storage shelf, where the cases are positioned relative to each other on the storage shelf in a tightly packed storage density;
vacuum-coupling a case to a vacuum case transfer mechanism dependent to and extending from the payload area along an extension axis of the automated guided vehicle to expose sides of the coupled case; and
gripping at least the lateral sides of the coupled case with a friction case transfer mechanism of the automated guided vehicle that is dependent to and extends from the payload area along the extension axis independent of the vacuum case transfer mechanism.

17. The method of claim 16, the friction case transfer mechanism and the vacuum case transfer mechanism cooperate with each other so as to transfer the case to the payload area substantially regardless of any loss of suction between the vacuum case transfer mechanism and the case.

18. The method of claim 16, wherein the case is gripped by the vacuum case transfer mechanism by one or more of a vacuum suction cup and a vacuum suction pad.

19. The method of claim 16, wherein the case is gripped by the friction case transfer mechanism by one or more of a driven roller, a conveyor belt, and actuable gripping members.

20. The method of claim 16, further comprising positioning the case relative to a centerline of the payload area with the actuable gripping members.

* * * * *